Sept. 16, 1924.                                                1,508,906
                          G. A. WOOD
METHOD AND MEANS OF PREVENTING SALT WATER REACTION AND GALVANIC
              ACTION IN WATER COOLED ENGINES
                    Filed June 29, 1922
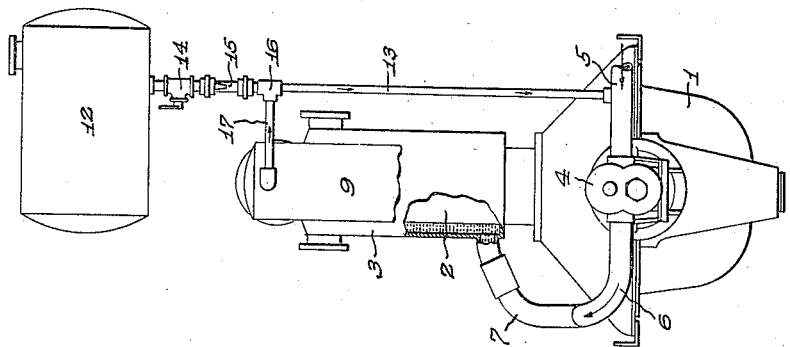
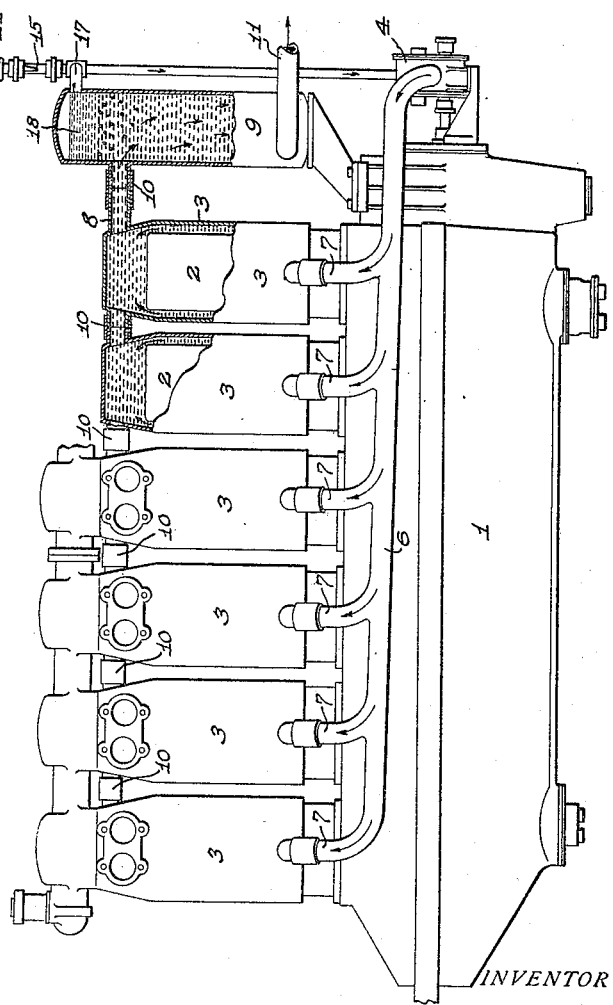
INVENTOR
BY  *Garfield A. Wood,*
         ATTORNEYS Patented Sept. 16, 1924.

1,508,906

UNITED STATES PATENT OFFICE.

GARFIELD A. WOOD, OF DETROIT, MICHIGAN.

METHOD AND MEANS OF PREVENTING SALT-WATER REACTION AND GALVANIC ACTION IN WATER-COOLED ENGINES.

Application filed June 29, 1922. Serial No. 571,846.

*To all whom it may concern:*

Be it known that I, GARFIELD A. WOOD, a citizen of the United States of America, residing at Detroit, in the county of Wayne and State of Michigan, have invented certain new and useful Improvements in Methods and Means of Preventing Salt-Water Reaction and Galvanic Action in Water-Cooled Engines, of which the following is a specification, reference being had therein to the accompanying drawings.

This invention relates to a method and means of preventing corrosion, galvanic action between different metals, and ultimate deterioration of the walls of engine cylinders and water jackets which are cooled by water circulation and subjected to the corrosive action of the water or any other liquid cooling agent. High speed motor boats, cruisers, and other water craft use aeroplane engines characterized by maximum horse power per pound weight, such engines having steel cylinders and light weight metallic water jackets. When operated in bodies of salt water such water is depended upon as a liquid cooling agent and consequently the cylinders of the engine are subjected to greater oxidization from the salt water than if operated in fresh bodies of water. I have found by actual experience that the deterioration of the engine cylinders is greater when salt water is used as a cooling agent, than when fresh water is used and in order to increase the longevity of high class engines I have devised means of rust proofing the outer walls of an engine cylinder subjected to moisture by virtue of the saline cooling agent.

I have found that the use of oil, and like substances on any metallic surface, will prevent, almost indefinitely, corrosion of such surface, and with this fact in mind I utilize the non-oxidizing, moisture including rust proofing qualities of oil as a coating medium for the confronting walls of a cylinder and water jacket. By virtue of the cooling agent the oil can be introduced into the water jacket and deposited on the walls as a film or coating which will prevent salt water or any saline cooling agent from attacking and corroding the walls. From a method standpoint, my invention involves, in its broadest aspect, the introduction of oil or a liquid coating into the water jacket of an internal combustion engine, and from a mechanical standpoint, I provide novel means for automatically and intermittently supplying the oil, preferably by a gravity feed system timed to the consumption or probable waste of oil in maintaining a rust proof coating on the confronting walls of the water jacket and engine cylinder.

My invention will be hereinafter specifically described and then claimed, and reference will now be had to the drawing, wherein—

Figure 1 is a side elevation of a multi-cylinder internal combustion engine, partly broken away and partly in section, and adapted for marine purposes, and Fig. 2 is an end view of the same.

In the drawing, the reference numeral 1 generally denotes a multi-cylinder internal combustion engine that may be used for marine purposes and this type of engine ordinarily includes cylinders 2; communicating water jackets 3 about the cylinders 2; a pump 4 driven from the crank shaft, cam shaft, or some other driven part of the engine; a water intake pipe 5, and a water discharge pipe 6 having branches 7 communicating with the jackets 3 to supply water thereto. One of the jackets 3 has a water outlet pipe 8 so that the pump 4 may continuously circulate water through the water jackets during the operation of the engine and thus cool the cylinder 2. In this type of high power engine the cylinders 2 are ordinarily made of steel or some light and durable metal, and the water jackets 3 are made of sheet metal or some light material, it being a desideratum when the engine has a minimum weight per horse power.

Considering my invention, from a structural standpoint, I provide a separating chamber 9 suitably supported from one end of the engine or from elsewhere so that the upper portion of the chamber 9 may be coupled, as at 10, to the water outlet pipe 8 of the water jackets 3 to receive water therefrom which is adapted to pass through the chamber 9 and discharge through a pipe 11 connected to the lower portion of the separation chamber. This separation chamber will not interfere with the circulation of water, in the usual manner, for cooling purposes. At some point above the chamber 9 and in proximity thereto I place an oil tank 12 adapted to contain a suitable oil that will adhere to a surface or at least leave a film-like coating on such surface. The tank 12 has the usual filling connection and vent and the bottom of said tank is provided with a down pipe 13 connected to and communicating with the water intake pipe 5. Installed on the down pipe 13 is a regulating valve 14, a drop feed and sight glass device 15 and a T connection 16, the latter being connected by a lateral overflow pipe 17 to the upper portion of the separation chamber 19, so that when a predetermined quantity of oil 18 accumulates in the upper portion of the chamber 9 it will overflow through the pipe 17 into the down pipe 13 and can be drawn in by the pump 4 from the pipe 5.

The regulating valve 14 permits of a predetermined quantity of oil being introduced into the circulating system maintained for cooling the walls of the cylinders 2 and the valve 14 may be regulated so that oil will be intermittently supplied to the down pipe 13. However, by regulating the speed of the pump 4, the location of the discharge pipe 11, and the configuration of the separation tank 9, there will be sufficient time for the oil carried through the water jackets to be precipitated in the chamber 9 to form the body of oil 18 buoyant on the body of water in said chamber. It is therefore possible to control, if not completely eliminate, any waste of oil and by using oil of a high specific gravity it will adhere to the walls of the cylinders 2 and the water jackets 3 and form organic coatings on such walls that will serve for rust proofing purposes.

My method of introducing oil into the water circulating and cooling system of an internal combustion engine will prevent water, especially of a salty nature, from corroding the walls of the cylinders and the water jackets, and it is obvious that by eliminating corrosion in connection with high class marine engines that such engine will have a greater period of usefulness.

Furthermore, my invention prevents salt water from setting up a galvanic action between iron, brass and other metallic parts exposed to the salt water. For instance, the small iron or brass parts, as bolts or nuts extend into a body of salt water, such metallic parts act as the electrodes of a battery and because of the galvanic action I have found that such metallic parts are destroyed or "eaten up."

On account of there being many types of water crafts and equipped with many types of internal combustion engines, I do not care to confine my invention, from a structural standpoint to any specific location of the water and oil separating chamber, the pump for maintaining the circulating system, or the oil supply tank, and it is obvious that the circulating system may be maintained by gravity, force feed or otherwise. Such other changes as are permissible by the appended claims may be resorted to without departing from the spirit of my invention.

What I claim is:—

1. Means for rust proofing the walls of a water jacket about an engine cylinder in which jacket a corrosive agent is circulated for cylinder cooling purposes, said means comprising, in combination with a pump, a tank adapted to supply oil to the pump, and oil and water separating means communicating with the water jacket and adapted for discharging water and returning the oil to the pump.

2. The combination with the cylinders of an internal combustion engine and water jackets about the cylinders for cooling purposes, and means adapted to circulate water in the jackets, of gravity supply means of introducing oil into the circulation of water, said means including an oil supply tank, and means for regulating the admixture of oil and water.

3. The combination with cylinders of an engine, water jackets about the engine cylinders, and a pump adapted to circulate water through the water jackets, of an oil and water separating chamber communicating with said water jackets to receive oil and water therefrom, and oil supply means communicating with said pump, said separating chamber communicating with said pump to return excess oil thereto.

4. The combination set forth in claim 3, wherein said oil supply means includes a tank and a regulating valve.

5. The combination set forth in claim 3, wherein said oil supply means includes a tank adapted to supply the oil by gravity to the pump, and a drop feed device as part of said supply means.

6. The combination with cylinders of an engine, water jackets about the engine, and means controlled by the operation of the engine adapted to circulate water through the water jackets, of means for introducing oil into the circulation of the water, said means including an oil tank, and means for regulating the admixture of oil and water.

In testimony whereof I affix my signature in presence of two witnesses.

GARFIELD A. WOOD.

Witnesses:
 CHAS. W. STAUFFIGER,
 KARL H. BUTLER.